Feb. 8, 1944.   E. T. CARLSON   2,341,311
BUS BAR DUCT SUPPORT
Filed March 28, 1942   2 Sheets-Sheet 1
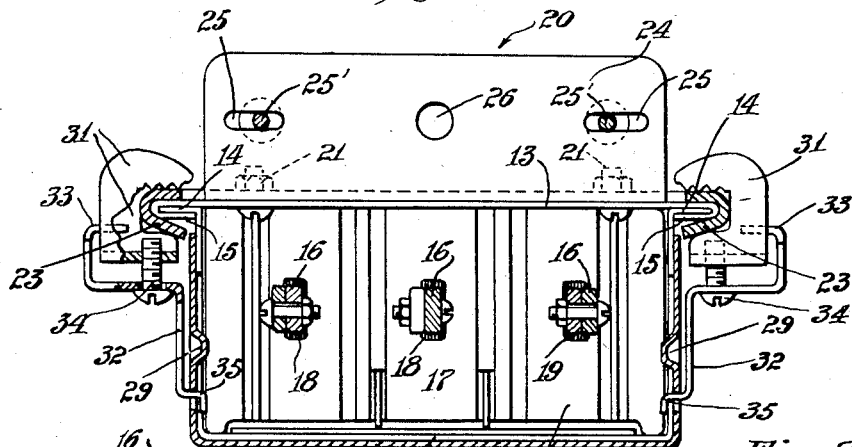
INVENTOR
Elmer T. Carlson Feb. 8, 1944.  E. T. CARLSON  2,341,311
BUS BAR DUCT SUPPORT
Filed March 28, 1942  2 Sheets-Sheet 2
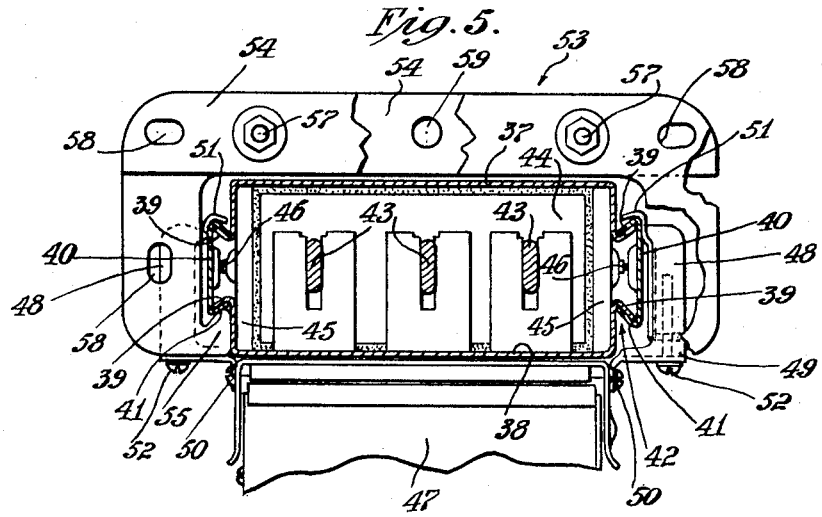
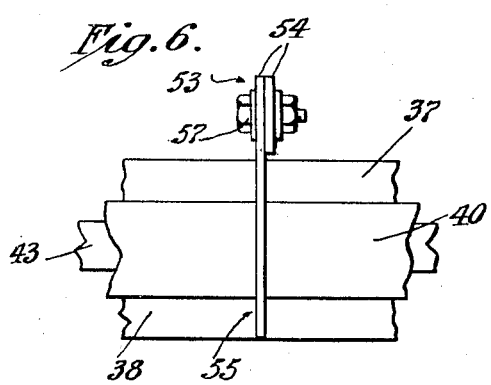
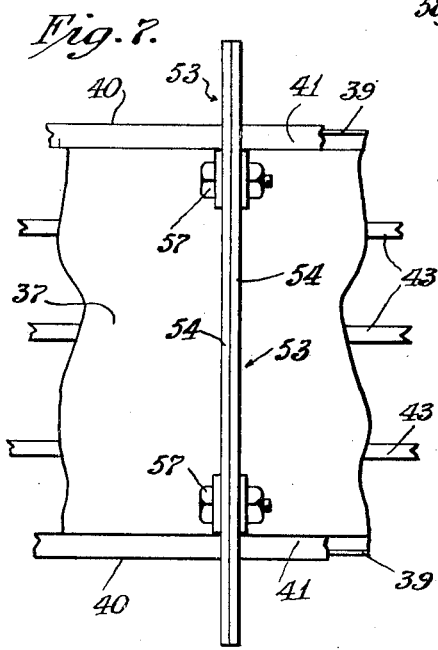
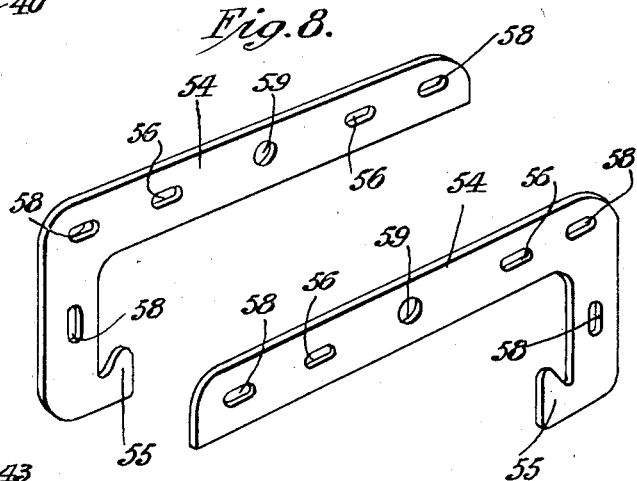
INVENTOR
Elmer T. Carlson
ATTORNEY Patented Feb. 8, 1944

2,341,311

UNITED STATES PATENT OFFICE 2,341,311

BUS BAR DUCT SUPPORT

Elmer T. Carlson, South Fort Mitchell, Ky., assignor to The Trumbull Electric Manufacturing Company, Plainville, Conn., a corporation of Connecticut Application March 28, 1942, Serial No. 436,583

7 Claims. (Cl. 138—75)

This invention relates to enclosed bus bar duct systems of power distribution and is a continuation in part of copending applications Serial Numbers 327,578 and 403,216.

One object is to provide a rugged duct structure that permits convenient and easy installation and inspection.

Another object is to provide a sectional duct structure with joints provided with external reinforcing combination plate and hanger devices providing easy access for inspection and repair.

Another object is to provide common means for effectively suspending the duct structure from an overhead support and for connecting the adjacent sections of the duct.

Another object is to provide a sectional duct structure with mechanically strong and sealed joints.

Another object is to provide means for aligning the sections of the duct.

Another object is to provide a duct structure with means for supporting it at any desired point along the structure.

Another object is to provide convenient means for securing terminal and branch boxes to a duct.

Another object is to provide a structure which is adapted to accommodate supports and hangers at any point without drilling or punching holes in the enclosure.

Fig. 1 is a transverse sectional view of a duct system embodying one form of my invention, taken on the plane of the line 1—1 of Fig. 2, parts being broken away.

Fig. 2 is a side view on a reduced scale of a part of a duct system embodying the invention.

Fig. 3 is a top view of the same.

Fig. 4 is an exploded perspective view showing the improved hanger in position.

Fig. 5 is a cross sectional view of a modified form of my invention showing a hanger and part of a plug-in box attached to the duct, parts being broken away.

Fig. 6 is a side view of a part of a duct system embodying the form of invention shown in Fig. 5.

Fig. 7 is an enlarged top plan view of the device of Fig. 6.

Fig. 8 is an enlarged spread perspective view of the hanger shown in Fig. 5.

In the form shown on sheet 1 the duct itself consists of two parts, the lower part 12 preferably of sheet metal formed into a U-shaped trough, and the upper part 13 being substantially flat. These two parts are connected together by interlocked flanges. The lower part has an outwardly flaring flange 14 at each edge, and the upper part 13 has an inturned flange 15 bent around the flange 14.

The bus bars 16 are supported by insulating blocks 17 arranged at suitable spaced intervals throughout the length of the duct. Each insulating block 17 has passages 18, 18 through which the bus bars extend. Soft rubber members 19 may be employed to hold the bus bars in place for instance in shipment.

It will be understood of course that the duct is made up of sections of suitable lengths, suitably secured together, end to end, in an installation, and that the duct is suspended from an overhead support. For the purpose of connecting the adjacent ends of the duct sections and for supporting the same there is provided an improved combination connector plate and hanger device 20 consisting of two complementary parts. Each part is identical and has a transverse connector plate 20' which is adapted to be secured to a duct member 13 by a number of bolts 21 which pass through transverse slots 22 in the plate 20' and through the duct member 13. The transverse slots permit adjustment laterally. Each plate has a hook-like flange 23 engaging one edge of the duct member 13. Each flange overlaps the flange of one duct section and the flange of an adjacent duct section.

Each part is also provided with another integral plate or flange 24 disposed at right angles to the plate 20'. Each plate 24 is provided with transverse slots 25 and a central opening 26. The plates are drawn together by screws or bolts 25' passing through said slots. This permits transverse adjustment of the plates and attached parts. The plates may be positioned in opposed relation by a pin or other instrument forced through the openings 26 to line up the two parts. When in proper position and alignment, the parts may serve as a hanger for suspending the duct from an overhead support by inserting a suitable hook, bar or the like (not shown) through the openings 26. By tightening the bolts 25', 25' the adjacent ends of the duct may be drawn toward each other. These bolts are arranged so as to prevent relative pivotal movement between the plates.

By eliminating the bolts 21, the plate members may be used as hangers for the system at any point along an assembled run of duct. In this case the hook-like flanges 23 constitute the only means of securing these members to the duct, with the bolts 25' holding the two parts of the hanger or connector together.

The adjacent ends of the duct sections may be provided with cut-away portions 27 to provide access to the bus bars and their connections.

A closure device 28 has flanges which overlap the sides of the duct member 12 and may have indented portions 29 adapted to be positioned by edges 30 near the ends of the duct sections.

To secure the member 28 in place, there is provided a special form of clamping device. Each clamp has a pair of jaws 31 adapted to enggae the edge 23 of the connector plate or the edge of the duct part 13. The jaw member 31 may be formed of sheet metal bent into U-shape. An anchorage bar 32 is connected to the clamp jaws by means of a hook-like terminal 33 and a clamp screw 34. The other end of the member 32 has a hook-like portion 35 adapted to be interlocked in slot 36 in the member 28. The assembled position of these parts may be seen in Fig. 1. To assemble the clamp, it is merely necessary to insert the hook-like end 35 into the opening 36 and then slip the jaws 31 over the edge 23 and tighten the screw 34. This screw then draws the member 28 to its seat on the duct member 12.

In the form shown in Figs. 5 to 8, inclusive, the channels 37 and 38 form the upper and lower parts or covers, respectively, of the duct system and have lateral flanges 39, 39 on each side, inclined at an angle and connected by channel-like moldings 40 whose edges 41, 41 are bent inwardly so as to form grooves 42 above and below.

The bus bars 43 are positioned by insulating blocks 44 which are in turn positioned by channel-like spreaders or posts 45, 45, each of which is anchored to the duct by screws 46, 46.

The covers are provided with openings (not shown) at intervals to accommodate the terminal blades or contacts (not shown) of branch connector boxes 47, where desired.

The branch connector box may be supported on the duct by hangers 48. Each hanger is composed of a body part 49 attached by a screw 50 to the box and a hook 51 connected to the body by an adjusting screw 52 so that the box can be drawn up snugly against the duct.

The duct may be suspended from the ceiling or other support by means of an improved hanger 53. This hanger comprises two L-shaped members 54, the short leg of each terminating in a hook 55. Each member 54 has spaced openings 56 to receive bolts 57 for fastening the members together, and each is provided with spaced slots 58 for receiving the lower ends of vertical supports (not shown).

These members 54, 54 may be aligned by a drift pin in the openings 59 and a supporting member may be inserted into these same openings.

Ordinarily these ducts are formed of sheet metal such as steel. By forming one of the channels or one of the moldings of non-magnetic material such as aluminum or brass I can prevent the formation of a complete magnetic field around the bus bars and still make the major part out of the less expensive and strong sheet iron or steel. This in some cases is quite important because a complete magnetic field will often cause humming or cause undue heating of the enclosure.

I claim:

1. In a sectional bus duct, a sectional channel body, a cover for each body section, flanges on opposite sides of said cover, a pair of complementary plates, one plate of a pair being positioned on a cover section adjacent one of the meeting edges of the cover sections, an integral hook-like flange on each plate, the hook-like flange of one plate being in engagement with the flanges of adjacent cover sections on one side of the channel body and the flange of the other plate being in engagement with the flanges of said adjacent cover sections on the opposite side of the channel body, means for adjustably fastening the plates together including elongated slots in said plates and means for connecting said plates to an overhead support including aligned openings in said plates for receiving a supporting member.

2. A sectional bus duct, each section including a top wall having opposite flanges, a pair of complementary plate members, one of said plates being fastened to the top wall of one section and having a portion overlapping the top wall of an adjacent section, the other of said plates being fastened to the top wall of said adjacent section and having a portion overlapping the top wall of the first named section and integral upstanding plates on said complementary plate members in opposed relationship, said opposed plates having aligned openings for receiving a device for suspending the duct from an overhead support.

3. In a sectional bus duct, a sectional channel body, a cover for each body section, flanges on opposite sides of said cover, a pair of complementary plates, one plate of a pair being positioned on a cover section adjacent one of the meeting edges of the cover sections, an integral hook-like flange on each plate, the hook-like flange of one plate being in engagement with the flanges of adjacent cover sections on one side of the channel body and the flange of the other plate being in engagement with the flanges of said adjacent cover sections on the opposite side of the channel body, means for fastening the plates together and means for connecting said plate to an overhead support, including integral flanges in opposed relationship, said flanges having alined openings for receiving a device for suspending the duct from an overhead support.

4. A sectional bus duct, each section including a top wall having opposite flanges, a pair of complementary plate members, one of said plates being fastened to the top wall of one section, the other of said plates being fastened to the top wall of said adjacent section and integral upstanding plates on said complementary plate members in opposed relationship, said opposed plates having aligned elongated slots for receiving a member for fastening the plates together and having aligned openings for receiving a device for suspending the duct from an overhead support.

5. A sectional bus duct, each section including a top wall having opposite flanges, a pair of complementary plate members at the meeting edges of the sections, each plate member having a portion overlying the top wall adjacent the end of the duct section with an integral hook in engagement with one of said flanges and having a portion disposed at an angle to said overlying portion, the angled portions of said plate members being in overlapping relationship for substantially the entire space between said flanges, and means for fastening said plate members together including spaced fastening devices coacting with the angled portions for preventing relative pivotal movement between the plate members.

6. The combination of two aligned bus duct sections arranged end to end and having laterally projecting flanges at opposite sides, connecting and supporting means comprising two plate members overlying the ends of said sections, bolt and slot means for adjustably securing the plate members to said sections, each plate member having a flange overlapping a flange of the section to which it is secured and having an extension extending outwardly from the latter section, means for securing said extensions together and means for attaching said extensions to a support.

7. A bus bar duct having laterally extending flanges along opposite edges, clamping and supporting means comprising plate members extending laterally from said duct, in contact with each other, with slots extending transversely of the duct and with aligning openings, and means for securing said plate members together comprising bolts extending through said slots, each of said plate members having a hook-like portion interlocked with a flange of said duct.

ELMER T. CARLSON.